United States Patent [19]
Montanaro et al.

[11] 3,803,030
[45] Apr. 9, 1974

[54] WASTE TREATMENT
[75] Inventors: Richard A. Montanaro, N. Kingstown, R.I.; Henry B. Moreau, Torino, Italy
[73] Assignee: Fram Corporation, East Providence, R.I.
[22] Filed: Aug. 10, 1972
[21] Appl. No.: 279,339

Related U.S. Application Data
[63] Continuation-in-part of Ser. No. 133,505, April 13, 1971, abandoned.

[52] U.S. Cl............... 210/26, 203/DIG. 16, 210/32, 210/34
[51] Int. Cl............................................ B01d 15/06
[58] Field of Search......... 210/24, 30, 31 R, 34, 41, 210/26, 32; 203/DIG. 16

[56] References Cited
UNITED STATES PATENTS
2,785,998  3/1957  Harding et al. ............... 210/31 R X
2,797,190  6/1957  Scott et al. ....................... 210/34 X
3,531,463  9/1970  Gustafson ........................ 210/24 X
2,561,695  7/1951  Gustafson ..................... 210/31 R X Primary Examiner—John Adee
Assistant Examiner—Ivars Cintins

[57] ABSTRACT

The process of removing contaminants from a liquid medium, comprising the steps of
a. contacting a quantity of the contaminated liquid medium with a solvent regenerable first adsorbent during a first phase, that adsorbent having an affinity for the contaminants and a volume which are insufficiently high to produce a desired degree of purification during the first phase, whereby a fraction of the contaminants is adsorbed by the first adsorbent and a partially purified effluent of the medium is produced,
b. contacting the partially purified effluent from said first phase with an ionic solution regenerable second adsorbent having an affinity for the contaminants and a volume which are sufficiently high to produce the desired degree of purification,
c. regenerating the first adsorbent with a solvent,
d. contacting a regenerant with the second adsorbent to remove the contaminants adsorbed thereon, and
e. contacting the effluent from step (d), comprising the regenerant and the contaminants removed thereby, with the first adsorbent, whereby an additional fraction of the contaminants is adsorbed by the first adsorbent.

11 Claims, 1 Drawing Figure

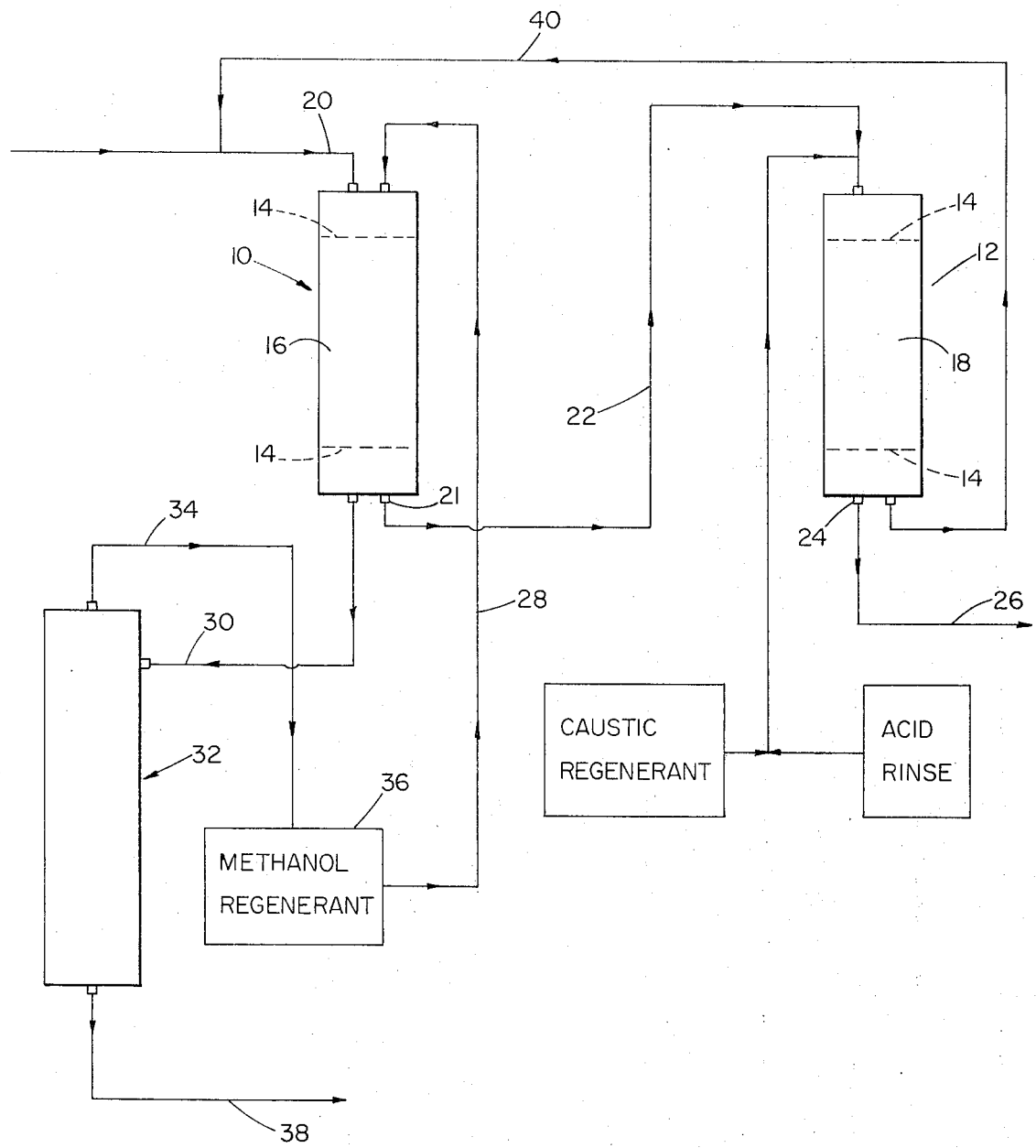

WASTE TREATMENT

This is a continuation-in-part of our co-pending U.S. Pat. application Ser. No. 133,505, filed Apr. 13, 1971, now abandoned.

This invention relates to removal of contaminants from a liquid medium, e.g. in the treatment of a dyehouse waste water stream containing objectionable concentrations of color bodies and metals.

Objects of the invention are to provide for a high degree of purification with an economical process suitable for treating a heavily contaminated waste stream and in which the ultimate waste regenerant volume (i.e., the volume of liquid in which the removed contaminants are isolated) is small. In preferred embodiments it is an object to provide a high degree of removal of color bodies and metals from a dyehouse waste stream, while minimizing consumption of adsorbent and regeneration materials.

In general the invention features a process of removing contaminants from a liquid medium, comprising the steps of a) contacting a quantity of the contaminated liquid medium with a solvent regenerable first adsorbent during a first phase, the adsorbent having an affinity for the contaminants and a volume which are insufficiently high to produce a desired degree of purification during the first phase, whereby a fraction of the contaminants is adsorbed by the first adsorbent, and a partially purified effluent of the medium is produced, b) contacting the partially purified effluent from the first phase with an ionically regenerable second adsorbent having an affinity for the contaminants higher than the affinity of the first adsorbent, the affinity of the second adsorbent and its volume being sufficiently high to produce the desired degree of purification, c) regenerating the first adsorbent, d) contacting a regenerant with the second adsorbent to remove the contaminants adsorbed thereon, and e) contacting the effluent from step d), comprising the regenerant and the contaminants removed thereby, with the first adsorbent, whereby an additional fraction of the contaminants is adsorbed by the first adsorbent. In preferred embodiments additional quantities of contaminated liquid are contacted with the first adsorbent during step e); the second adsorbent is base regenerable; the regenerant in step d) is a hot caustic solution and is followed by an acid rinse, the caustic and rinse thereafter being recycled to the first adsorbent, the contaminated liquid medium being controlled to be on the acidic side (e.g., pH between three and five) at the first adsorbent; step c) comprises regeneration with a solvent, and the effluent from step c), comprising the solvent and contaminants removed from the first adsorbent, is reduced in volume to produce a concentrate for disposal, the concentration of contaminants in the concentrate being of the order of 100 times the corresponding original concentration in the contaminated liquid medium; the solvent is methanol which is recovered by distillation; the adsorbents are macroreticular resins, the second having an average pore diameter of the order of 10 times that of the first and a dipole moment at least twice that of the first, the first having a range of pore diameters including diameters of the order of magnitude of the average pore diameter of the second; and the contaminated liquid medium has original high concentrations of color bodies and metallic contaminant.

Other objects, features and advantages of the invention will be apparent from the following description of a particular preferred embodiment taken together with the semi-schematic drawing.

The drawing shows schematically a system useful to purify a waste water stream from a dyehouse in which anthraquinone and azo dyestuffs are manufactured.

Principal contaminants of the waste water stream are acids, carbonaceous materials, suspended and soluble color bodies, and several metals.

In a typical run on a stream sample containing an azo filtrate with chromium and cobalt present in ionic and chelated forms, the system of the invention, with total average residence time in the system of 15 minutes, reduced color density from 80.8 optical density units (taken as the total of optical density units corresponding to measurements with light at wavelengths of 450, 550, and 650 millimicrons, respectively) to zero optical density units, C.O.D. (i.e., Chemical Oxygen Demand) from 1,797 p.p.m. to 135 p.p.m., chromium from 34.4 p.p.m. to zero p.p.m., cobalt from 26.0 p.p.m. to 4.4 p.p.m., and T.O.C. (i.e., Total Organic Carbon) from 760 p.p.m. to 40 p.p.m.

In a second typical run, on a stream sample containing an anthraquinone filtrate with copper in ionic form, the system, with total average residence time of 30 minutes, reduced color density from 72 optical density units to zero optical density units, C.O.D. from 5,025 p.p.m. to 1,200 p.p.m., copper from 240 p.p.m. to 125 p.p.m., T.O.C. from 2,000 p.p.m. to 420 p.p.m., and total suspended solids from 173 p.p.m. to 44.7 p.p.m.

Referring to the drawing, columns 10 and 12 contain, between screens 14, beds 16 and 18 of macroreticular polymer resin adsorbent particles. Macroreticular polymer resins in general consist of beads composed of microspheres, with large pores (e.g. of the order of 100Å. pore diameter) and large surface area (e.g. of the order of 100 m.²/gm.); are described in an article "Adsorption of Organic Species by High Surface Area Styrene-Divinylbenzene Copolymers," published in I & EC Product Research and Development, Vol. 7, p. 107, June 1968 (American Chemical Society), and in other references cited therein; and are sold by Rohm and Haas Co. under the trade designation Amberlite and by Diamond Shamrock Co. under the trade designation Duolite. In this instance, bed 16 is Amberlite XAD-7 (a solvent regenerable resin) and bed 18 is Amberlite XAD-12 (a base regenerable resin). However, Duolite S-37 may be substituted for the Amberlite XAD-12 and is presently preferred. The beds 16 and 18 preferably contain equal volumes of resin although other ratios are suitable (e.g., for a bed 18 of two units, the range of volumes for bed 16 which will yield good results is at least one unit to four units).

The waste stream is supplied to the top of column 10 through conduit 20 and percolates through bed 16 to provide a partially clarified effluent at outlet 21 which flows through conduit 22 to the top of column 12 for percolation through bed 18.

The affinity of the adsorbent in bed 16 for the contaminants to be removed is insufficient to provide a high degree of purification at outlet 21. Thus, in the first typical run referred to above, the effluent at outlet 21 had color density of 20 optical density units, C.O.D. of 682 p.p.m., chromium of 6.5 p.p.m., cobalt of 15.6 p.p.m., and T.O.C. of 255 p.p.m. However, after passage of that effluent through bed 18, in which the adsorbent has a higher affinity for the contaminants, highly purified effluent is produced at outlet 24 and is carried away through conduit 26. In the second typical run described above, the effluent at outlet 21 had color density of 1.9 optical density units, C.O.D. of 2,330 p.p.m., copper of 210 p.p.m., T.O.C. of 780 p.p.m., and total suspended solids of 52 p.p.m.

The ease of regeneration of beds 16 and 18 is in inverse relation to their affinity for contaminants. Thus, when bed 16 becomes fully loaded, it is regenerated by elution with hot (60° C.) methanol supplied to the top of column 10 through conduit 28. The methanol, entrained water, and eluted contaminants are taken from the bottom of the column through conduit 30 to a still 32, where the methanol is recovered by distillation and returned through conduit 34 to reservoir 36. The methanol left entrained on bed 16 is steam stripped from the resin and taken off through the top of the column. A waste stream, in which the concentration of contaminants is one hundred times as great as in the original stream in conduit 20, is carried from still 32 through conduit 38 for final disposal. The more tightly held contaminants in bed 18 (containing the polar adsorbent) are removed by passing a hot caustic solution (0.1–4.0 percent concentration) through column 12 from top to bottom, followed by an acid rinse to restore bed 18 to essentially its original capacity. The caustic, acid rinse, and desorbed contaminants are carried through conduit 40 to the main waste stream for subsequent passage therewith through columns 10 and 12 in the manner already described. The pH in conduit 20 is kept on the acidic side (e.g., between 3 and 5) to facilitate adsorption.

The described cycles of adsorption and regeneration are repeatedly carried out, so that contaminants initially adsorbed on bed 18 are repeatedly recycled and eventually adsorbed on bed 16 (where the absolute range of pore size overlaps the average pore size associated with bed 18). The solvent regeneration of bed 16 isolates all removed contaminants in the solvent. Distillation of the solvent provides the final degree of contaminant concentration.

From the foregoing it is evident that the process of the present invention achieves the desired high degrees of waste purification and contaminant concentration. It has further been determined that, for an acceptable degree of waste purification, neither a typical non-polar nor a typical polar adsorbent alone would approach the efficiency desired. For 100 gallons of dyestuff wastewater, a volume of five units of non-polar adsorbent was required to achieve 99+ percent color removal and contaminant concentration (after adsorbent regeneration) was only 20 to 1. One unit of polar resin achieved the same degree of color removal, but resulted in only an 8 to 1 concentration. Combining the resins in series in a process in accordance with the present invention produced the same degree of color removal in 100 gallons of dyestuff wastewater with only 1.4 units of resin and with a concentration of 100 to 1. Thus, not only does the present process achieve better results, but it does so economically (i.e., a relatively small amount of resin is required).

Other embodiments will occur to those skilled in the art and are within the following claims.

What is claimed is:

1. The process of removing contaminants from a liquid medium, comprising the steps of
   a. contacting a quantity of the contaminated liquid medium with a solvent regenerable first adsorbent during a first phase, said adsorbent having an affinity for said contaminants which is insufficiently high to produce a desired degree of purification during said first phase, whereby a fraction of said contaminants is adsorbed by said first adsorbent and a partially purified effluent of said medium is produced,
   b. contacting said partially purified effluent from said first phase with an ionic solution regenerable second adsorbent having an affinity for said contaminants which is sufficiently higher than that of said first adsorbent to produce said desired degree of purification,
   c. regenerating said first adsorbent with a solvent,
   d. contacting a regenerant with said second adsorbent to remove said contaminants adsorbed thereon,
   e. contacting the effluent from step d), comprising said regenerant and said contaminants removed thereby, with said first adsorbent, whereby an additional fraction of said contaminants is adsorbed by said first adsorbent, and
   f. reducing the volume of the effluent from step c) by distillation to recover said solvent.

2. The process of claim 1 wherein additional quantities of contaminated liquid medium are contacted with said first adsorbent during step e).

3. The process of claim 1 wherein said regenerant of step d) is a hot caustic solution, and wherein step d) further comprises contacting said second adsorbent with an acid rinse after regeneration with said caustic solution, and said effluent from step d) which is contacted with said first adsorbent includes said rinse.

4. The process of claim 3 further comprising the step of controlling the pH in said contaminated liquid medium to be on the acidic side at said first adsorbent.

5. The process of claim 4 wherein said pH at said first adsorbent is between 3 and 5.

6. The process of claim 1 wherein said solvent comprises methanol.

7. The process of claim 1 wherein said contaminants comprise metals and color bodies in a dyehouse wastewater stream.

8. The process of claim 1 wherein said adsorbents comprise macroreticular resins.

9. The process of claim 1 wherein said contaminated liquid medium has high concentrations of color bodies and metallic contaminant.

10. The method of concentrating contaminants removed from a liquid medium in a plural phase removal system in which a quantity of the contaminated liquid medium is brought into contact with a first adsorbent during a first phase, said adsorbent having an affinity for said contaminants which is insufficiently high to produce a desired degree of purification during said first phase, whereby a fraction of said contaminants is adsorbed by said first adsorbent and a partially purified effluent of said medium is produced, and then contacting said partially purified effluent from said first phase with a second adsorbent having an affinity for said contaminants which is sufficiently higher than that of said first adsorbent to produce the desired degree of purification, said concentration process comprising:

a. providing as said first adsorbent a solvent regenerable adsorbent and as said second adsorbent an ionic solution regenerable adsorbent,
b. contacting a regenerant with said second adsorbent to remove said contaminants adsorbed thereon,
c. contacting the effluent from step b), comprising said regenerant and said contaminants removed thereby, with said first adsorbent, d. contacting a solvent regenerant with said first adsorbent, and
e. reclaiming said solvent regenerant by distillation.

11. The method of claim 10 wherein said second adsorbent is base regenerable, said regenerant of step b) is a caustic solution, and said solvent regenerant is methanol.

* * * * *